United States Patent
Bauer et al.

(10) Patent No.: US 11,129,497 B2
(45) Date of Patent: Sep. 28, 2021

(54) BAKED GOOD HANDLING SYSTEM

(71) Applicant: Prince Castle LLC, Carol Stream, IL (US)

(72) Inventors: Richard Bauer, Palatine, IL (US); Glenn Schackmuth, Oswego, IL (US); Scott Rote, Mokena, IL (US); Nathan Wicker, Chicago, IL (US); Thomas Tyrawa, Streamwood, IL (US); Marcus Frio, St. Charles, IL (US); Steven Shei, Fort Wayne, IN (US); Quinton Ford, Chicago, IL (US); Greg Klostermann, Carol Stream, IL (US); Sajid Safvi, Carol Stream, IL (US); David E. Paton, Bartlett, IL (US); Tyler Greek, Plainfield, IL (US); Mark Kurth, Carol Stream, IL (US); Sean Forrest, Carol Stream, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 388 days.

(21) Appl. No.: 16/209,437

(22) Filed: Dec. 4, 2018

(65) Prior Publication Data
US 2019/0167040 A1    Jun. 6, 2019

Related U.S. Application Data

(60) Provisional application No. 62/613,993, filed on Jan. 5, 2018, provisional application No. 62/594,873, filed
(Continued)

(51) Int. Cl.
*A47J 37/08*    (2006.01)
*G07F 11/28*    (2006.01)
(Continued)

(52) U.S. Cl.
CPC .......... *A47J 37/0857* (2013.01); *A21C 15/00* (2013.01); *A47J 37/044* (2013.01);
(Continued)

(58) Field of Classification Search
CPC .. A47J 37/044; A47J 37/0857; A47J 37/0864; A47J 37/0871; A47J 39/00;
(Continued)

(56) References Cited

U.S. PATENT DOCUMENTS 3,183,856 A    5/1965   Jolly
3,266,442 A    8/1966   Udall et al.
(Continued)

FOREIGN PATENT DOCUMENTS

CA    2923038 A1    12/2015
CN    105608794    5/2016
(Continued)

OTHER PUBLICATIONS

International Search Report and Written Opinion issued in corresponding PCT Application No. PCT/US2018/063846, dated Mar. 21, 2019.

*Primary Examiner* — Hung D Nguyen
(74) *Attorney, Agent, or Firm* — Andrus Intellectual Property Law, LLP

(57) ABSTRACT

A baked goods handling system includes a holding cabinet operable to create a controlled environment therein. A dispenser receives a baked good from the holding cabinet and directs the baked good away from the holding cabinet. A treatment device receives the baked good from the dispenser to perform a treatment on the baked good.

17 Claims, 6 Drawing Sheets

Related U.S. Application Data on Dec. 5, 2017, provisional application No. 62/614,015, filed on Jan. 5, 2018.

(51) Int. Cl.
- *A21C 15/00* (2006.01)
- *A47J 37/04* (2006.01)
- *A47J 39/00* (2006.01)

(52) U.S. Cl.
CPC ........... *A47J 37/0864* (2013.01); *G07F 11/28* (2013.01); *A47J 39/00* (2013.01); *B65G 2201/0202* (2013.01)

(58) Field of Classification Search
CPC ..... A21C 15/00; A21C 15/002; A21C 15/007; A21C 15/04; G07F 11/28; B65G 2201/0202
USPC ........... 99/385, 386, 393, 443 R, 443 C, 387
See application file for complete search history.

(56) References Cited

U.S. PATENT DOCUMENTS

| | | |
|---|---|---|
| 3,343,715 A | 9/1967 | Edwards |
| 3,915,316 A | 10/1975 | Pomara, Jr. |
| 4,006,831 A | 2/1977 | Jimenez |
| 4,034,661 A | 7/1977 | Boosalis et al. |
| 4,054,015 A | 10/1977 | Rowell |
| 4,261,257 A | 4/1981 | Henderson et al. |
| 4,503,502 A | 3/1985 | Chapin |
| 4,530,632 A | 7/1985 | Sela |
| 4,547,851 A | 10/1985 | Kurland |
| 4,553,222 A | 11/1985 | Kurland et al. |
| 4,620,826 A | 11/1986 | Rubio et al. |
| 4,677,888 A | 7/1987 | Terrangnoli |
| 4,760,777 A | 8/1988 | Welsh |
| 4,797,818 A | 1/1989 | Cotter |
| 4,919,950 A | 4/1990 | Mak |
| 4,922,435 A | 5/1990 | Cahlander et al. |
| 4,944,218 A | 7/1990 | Cresson |
| 5,000,345 A | 3/1991 | Brogna et al. |
| 5,127,544 A | 7/1992 | Robinson et al. |
| 5,132,914 A | 7/1992 | Cahlander et al. |
| 5,172,328 A | 12/1992 | Cahlander et al. |
| 5,253,762 A | 10/1993 | Duncan |
| 5,540,943 A | 7/1996 | Naramura |
| 5,546,848 A | 8/1996 | Naramura |
| 5,562,183 A | 10/1996 | Naramura |
| 5,724,886 A | 3/1998 | Ewald et al. |
| 5,755,149 A | 5/1998 | Blanc et al. |
| 5,763,861 A | 6/1998 | Herrera et al. |
| 6,236,974 B1 | 5/2001 | Kolawa et al. |
| 6,298,331 B1 | 10/2001 | Walker et al. |
| 6,473,739 B1 | 10/2002 | Showghi et al. |
| 6,585,477 B1 | 7/2003 | Lawrence |
| 6,647,864 B1 | 11/2003 | Fang |
| 6,704,616 B2 | 3/2004 | Formon |
| 6,751,525 B1 | 6/2004 | Crisp, III |
| 6,930,296 B2 | 8/2005 | Chen |
| 7,092,988 B1 | 8/2006 | Bogatin et al. |
| 7,110,964 B2 | 9/2006 | Tengler et al. |
| 7,141,258 B2 | 11/2006 | Hillmann |
| 7,183,518 B2 | 2/2007 | Near et al. |
| 7,353,136 B2 | 4/2008 | Vock et al. |
| 7,478,749 B2 | 1/2009 | Clothier et al. |
| 7,493,362 B2 | 2/2009 | Bogatin et al. |
| 7,757,602 B2 | 7/2010 | Aubry et al. |
| 7,885,852 B2 | 2/2011 | Banerjee et al. |
| 8,307,951 B2 | 11/2012 | Sus et al. |
| 8,448,567 B2 | 5/2013 | Martin et al. |
| 8,458,311 B2 | 6/2013 | Jang et al. |
| 8,498,896 B2 | 7/2013 | Banerjee et al. |
| 9,049,875 B2 | 6/2015 | Ewald et al. |
| 9,066,627 B2 | 6/2015 | Baranowski et al. |
| 9,090,446 B2 | 7/2015 | Crisp, III |
| 9,295,282 B2 | 3/2016 | Vardakostas et al. |
| 9,326,544 B2 | 5/2016 | Vardakostas et al. |
| 9,327,958 B2 | 5/2016 | Angus et al. |
| 9,532,575 B1 | 1/2017 | Donisi et al. |
| 9,585,401 B2 | 3/2017 | Wiker et al. |
| 9,652,756 B2 | 5/2017 | Knecht et al. |
| 9,701,530 B2 | 7/2017 | Kline et al. |
| 9,718,568 B2 | 8/2017 | Vardakostas et al. |
| 9,770,049 B2 | 9/2017 | Vardakostas et al. |
| 9,788,687 B2 | 10/2017 | Frehn et al. |
| 9,805,351 B2 | 10/2017 | Harman |
| 10,067,109 B2 | 9/2018 | Frehn et al. |
| 10,068,273 B2 | 9/2018 | Frehn et al. |
| 10,086,525 B2 | 10/2018 | Engel-Hall et al. |
| 2002/0059859 A1 | 5/2002 | Verklan |
| 2003/0078793 A1 | 4/2003 | Toth |
| 2004/0083201 A1 | 4/2004 | Sholl et al. |
| 2004/0107141 A1 | 6/2004 | Conkel et al. |
| 2004/0143503 A1 | 7/2004 | Suthar |
| 2004/0238555 A1 | 12/2004 | Parks |
| 2005/0049940 A1 | 3/2005 | Tengler et al. |
| 2005/0182680 A1 | 8/2005 | Jones, III et al. |
| 2007/0251521 A1 | 11/2007 | Schackmuth et al. |
| 2008/0163762 A1* | 7/2008 | Weiss .................... G07F 9/105 99/443 C |
| 2008/0319864 A1 | 12/2008 | Leet |
| 2009/0070229 A1 | 3/2009 | Ansari et al. |
| 2009/0152345 A1 | 6/2009 | Johnson |
| 2010/0049578 A1 | 2/2010 | Salerno |
| 2010/0274633 A1 | 10/2010 | Scrivano et al. |
| 2012/0143730 A1 | 6/2012 | Ansari et al. |
| 2014/0324607 A1 | 10/2014 | Frehn |
| 2014/0330686 A1 | 11/2014 | Kulasooriya et al. |
| 2015/0013550 A1 | 1/2015 | Lin |
| 2015/0019354 A1 | 1/2015 | Chan et al. |
| 2015/0187027 A1 | 7/2015 | Lowe |
| 2015/0199667 A1 | 7/2015 | Fernando et al. |
| 2016/0026958 A1 | 1/2016 | Lee |
| 2016/0183728 A1 | 6/2016 | Moma-M04-Us1-App-Ads et al. |
| 2016/0235239 A1 | 8/2016 | Patadia |
| 2016/0236367 A1 | 8/2016 | Engel-Hall et al. |
| 2016/0244311 A1 | 8/2016 | Burks et al. |
| 2016/0253084 A1 | 9/2016 | Deville et al. |
| 2016/0330982 A1 | 11/2016 | Frehn et al. |
| 2016/0338545 A1 | 11/2016 | Shah et al. |
| 2016/0379293 A1 | 12/2016 | Barajas Gonzalez et al. |
| 2017/0018041 A1 | 1/2017 | Fox |
| 2017/0024789 A1 | 1/2017 | Frehn et al. |
| 2017/0065117 A1 | 3/2017 | Reese et al. |
| 2017/0116661 A1 | 4/2017 | Sundaram |
| 2017/0208940 A1 | 7/2017 | Boudreault |
| 2017/0215631 A1 | 8/2017 | Studor et al. |
| 2017/0258257 A1 | 9/2017 | Guh |
| 2017/0280763 A1 | 10/2017 | Nazarian et al. |
| 2017/0290345 A1* | 10/2017 | Garden ................. B25J 9/0093 |
| 2018/0186022 A1 | 7/2018 | Fox et al. |

FOREIGN PATENT DOCUMENTS

| | | |
|---|---|---|
| DE | 102005012536 | 9/2006 |
| DE | 102015113398 | 2/2017 |
| EP | 296496 | 12/1988 |
| EP | 777201 | 6/1997 |
| EP | 1337170 | 3/2007 |
| WO | 199109558 | 7/1991 |
| WO | 2009120262 | 10/2009 |
| WO | 2013184910 | 12/2013 |
| WO | 2016079610 | 5/2016 |
| WO | 2017136605 | 8/2017 |
| WO | 2017177041 | 10/2017 |

* cited by examiner

BAKED GOOD HANDLING SYSTEM

CROSS-REFERENCE TO RELATED APPLICATIONS

The present application claims priority of U.S. Provisional Patent Application No. 62/594,873, filed on Dec. 5, 2017, U.S. Provisional Patent Application No. 62/614,015, filed on Jan. 5, 2018, and U.S. Provisional Patent Application No. 62/613,993, filed on Jan. 5, 2018, the contents of which are all hereby incorporated by reference in their entireties.

BACKGROUND

The present disclosure is related to the field of food preparation. More specifically, the present disclosure is related to systems and methods of handling baked goods for use in the assembly of sandwiches in a food preparation setting.

Many restaurant and food service settings, particularly quick service restaurants (QSR) use a combination of pre-prepared and on-demand prepared food components in order to assemble foods ordered by customers, for example, hamburgers or sandwiches within a customer's time expectation. While one approach to order assembly would be to sequentially prepare each food item constituent on demand in the order in which it is needed, however, customer food preparation time expectations are not met with such an approach.

Additionally, as the number of menu options and accommodation of customer special requests or customizations proliferate, there is a need for management of a greater number and variety of food items and constituents. Management of prepared food constituent inventory is more challenging as the number of food constituents increases. Also, as order assembly becomes more complicated, the assembly instructions are harder for food preparation workers to remember and correctly follow. This creates a greater learning curve for new or inexperienced workers or for the introduction of new menu items.

Bread, rolls, or other baked goods commonly form the structure on or within which the substance of a sandwich or other food item is held. Sandwiches, including hamburgers, club sandwiches, open-faced sandwiches, and wrapped sandwiches are commonly prepared foods in restaurants and kitchens. In the QSR, fast casual restaurant, or institutional kitchen setting, handling (and toasting, if necessary) of the baked good can take nearly half of the total time required to prepare the ordered sandwich. As a further challenge, if left exposed, baked goods can quickly become stale, prone to mold, or otherwise degrade in flavor.

There is a trend in restaurants and food service for increased menu options and for accommodation of further customer custom requests. This adds to the complexity of food item orders and foodservice workers are less able to rely on memorization of food item recipes to assemble the order. Increased menu options and custom accommodations further contribute to slow the assembly of these food items.

Thus further solutions are needed for the handling and preparation of baked goods in a restaurant or foodservice setting, particularly in the preparation of sandwiches in such a setting.

BRIEF DISCLOSURE

An exemplary embodiment of a baked goods handling system includes a holding cabinet operable to create a controlled environment therein. A dispenser is connected to the holding cabinet. The dispenser receives a baked good from the holding cabinet and directs the baked good away from the holding cabinet. A treatment device is disposed relative to the dispenser such that the treatment device receives the baked good from the dispenser to perform a treatment on the baked good.

In an exemplary embodiment, the handling system includes a kitchen management system (KMS) communicatively connected to the holding cabinet, the dispenser, and the treatment device. A point of sale system is communicatively connected to the KMS, the point of sale system receives an input of a food order and provides the food order to the KMS. The KMS identifies at least one baked good associated with the food order and instructs the holding cabinet and the dispenser to retrieve the identified at least one baked good from the holding cabinet, and the KMS instructs the treatment device with treatment configurations for treating the at least one baked good. The treatment device may be a toaster.

In further exemplary embodiments of handling systems, a bun separator is configured to engage a baked good dispensed from the holding cabinet and mechanically force apart at least two portions of the baked good.

The handling system may include a plurality of trays. The plurality of trays may be movable within the holding cabinet to orient a tray of the plurality of trays relative to the dispenser. The trays may further include conveyors upon which baked goods are loaded and the conveyors are operable to move a baked good out of the holding cabinet. The holding cabinet may further include at least one conveyor. The at least one conveyor may operate to advance baked goods of a plurality of baked goods held on the plurality of trays out of the holding cabinet. The dispensing system may include a plurality of trays. Each tray may include at least one chute, and the chutes are independently or semi-independently movable within the holding cabinet to select between chutes filled with different baked goods to a position relative to the dispenser.

In the handling system, the holding cabinet and the dispenser are configured as a single unit.

An exemplary embodiment of a baked good dispenser includes a baked good control device that operates to selectively release a baked good. A bun separator engages the released baked good and divides the baked good into a first portion and a second portion and directs the first portion and the second portion to different locations. Embodiments of the baked good dispenser may further include a ramp that directs the released baked good towards a dispenser outlet, wherein the bun separator is positioned at the dispenser outlet.

Exemplary embodiments of the baked good dispenser includes a holding cabinet operable to create a controlled environment conducive for holding baked goods and the baked good control device releases the baked good from the holding cabinet. The baked good control device may include a gate between at the holding cabinet. The baked good control device may include at least one conveyor within the holding cabinet. The baked good control device may include a plurality of trays, each tray configured to receive a plurality of baked goods. The plurality of trays are received within the holding cabinet and the at least one conveyor operates to advance baked goods of the plurality of baked goods out of the holding cabinet. The controlled environment comprises at least one of a controlled temperature, a controlled humidity, and a controlled atmosphere composition. The holding cabinet and the baked good control device receive operation instructions through a communicative connection from the baked good dispenser to a kitchen management system (KMS). Based upon the operation instructions received from the KMS, the holding cabinet and the baked good control device operate to retrieve and dispense an identified at least one baked good from the holding cabinet.

In exemplary embodiments of the baked good dispenser, the bun separator may include a conveyor and a restriction, and the conveyor operates to move the baked good through the restriction. In exemplary embodiments of the baked good dispenser, the bun separator may include a physical obstruction that engages the baked good.

DETAILED DISCLOSURE

As provided herein exemplary embodiments of devices and systems for handling and dispensing baked goods in a restaurant or food service setting. The systems and devices as disclosed herein can be exemplarily used to handle a wide variety of baked goods, including but not limited to buns, rolls, English muffins, croissants, bagels, muffins, flatbread, pitas, cakes, pastries, and so forth.

Figure 1:
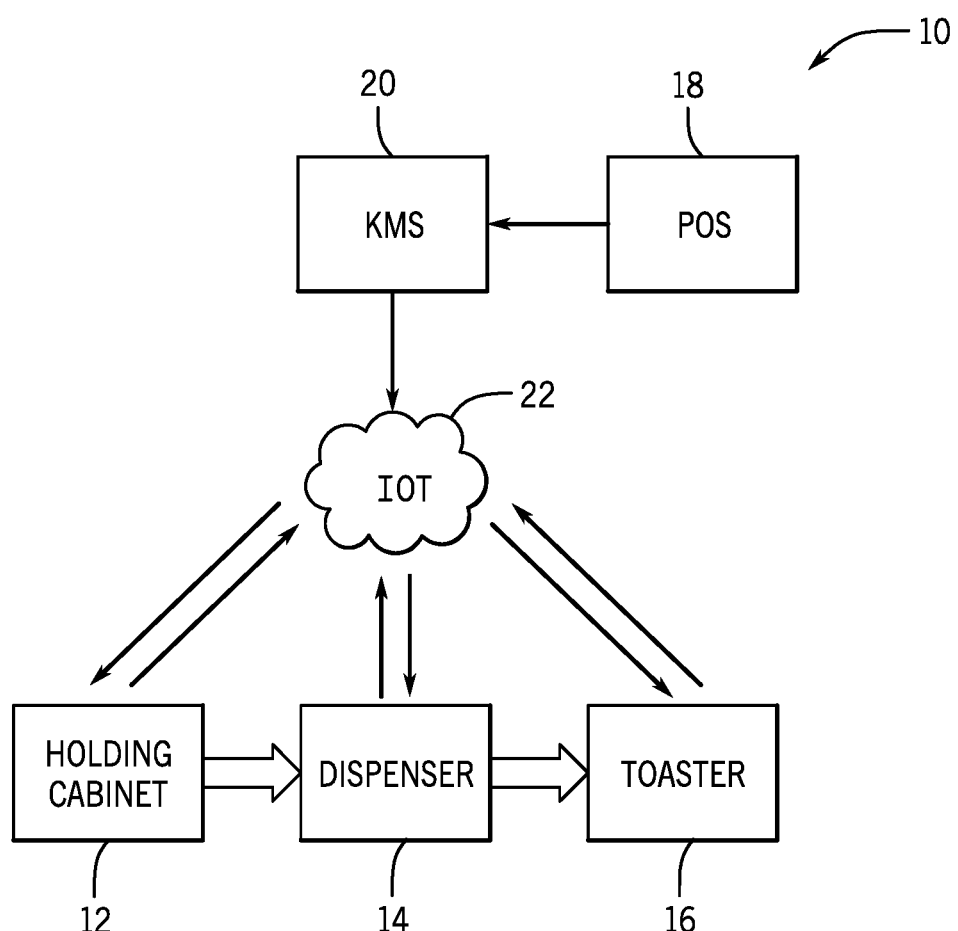
FIG. 1 is a system diagram of an exemplary embodiment of a baked goods handling system.

FIG. 1 is a system diagram of a baked good handling system 10 as will be described in further detail herein. The handling system 10 generally includes three components, a holding cabinet 12, a dispenser 14, and a treatment device, which may exemplarily be a toaster 16, as used in the present example. While these components will all be described in further detail herein, the holding cabinet 12 establishes and provides an environment conducive to extending the time that baked goods can be held without degradation in quality. The dispenser 14 selects an individual baked good from a plurality of baked goods which may all be the same or may include a variety of baked goods for dispense. The dispenser 14 delivers the baked good to an output location and may further include separation of the baked good into halves. The output location of the dispenser 14 may be a treatment device, for example, a toaster 16. The toaster 16 is operated to provide a required amount of heat to the baked good to create a palatable Maillard reaction in the baked good. While the example treatment device of a toaster is generally used herein, embodiments may use other types of treatment devices as well. Treatment devices may include apparatus to perform a treatment on a dispensed baked good, such treatments including, but not limited to steaming, heating, topping, or packaging. Therefore, other treatment devices within the scope of the present disclosure may include a steamer, a condiment dispenser, or a packaging machine. Exemplary embodiments herein may describe the holding cabinet 12, dispenser 14, and toaster 16 as separate devices, however, it will be recognized from the present disclosure that in other embodiments, some or all of these components may be combined into an integrated device that performs two or more of the functions of these devices.

In an exemplary embodiment, a customer order is exemplarily received from a point of sale (POS) system 18, the customer order identifies one or more food products requiring assembly to complete the order. The customer order is exemplarily provided to a kitchen management system (KMS) 20 that identifies the components of each of the food products in the customer order and also exemplarily tracks, manages, and coordinates kitchen inventory and the order in which food products are processed, for example, with the baked good handling system 10. In doing so, the KMS 20 can provide control signals to each of the devices in the baked good handling system 10, and any other communication-enabled devices in the kitchen. The holding cabinet 12, the dispenser 14, and the toaster 16 are each communicatively connected to the KMS 20 to receive these instructions of the customer orders and the baked goods needed for the incoming orders. In embodiments, the KMS 20 may be directly connected to one or more of the holding cabinet 12, the dispenser 14, and the toaster 16. In other embodiments, an internet-of-things (IOT) communications system 22 may be intermediate to the POS system 18, the KMS 20 and the devices of the baked good handling system. The IOT communications system 22 may communicatively connect the KMS 20 to each of the holding cabinet 12, the dispenser 14, and the toaster 16, as well as to other communication enabled devices within the kitchen setting.

While the POS system 18 and the KMS 20 are depicted as separate systems, it will be recognized that the POS system 18 and the KMS 20 may be provided as a single integrated system. The POS system 18 and the KMS 20 may be provided locally to the rest of the baked good handling system 10, but may also be provided wholly or partially from a remote location, for example through a networked or cloud-computing enabled implementation. Food item orders are exemplarily received at the POS system 18. The interface to the POS system 18 may be a register computer operated by a cashier, a drive-through ordering system, or an online ordering system, or any other point of sale order entry arrangement as will be recognized by a person of ordinary skill in the art in view of the present disclosure. The POS system 18 takes in the customer order which specifies one or more food items which require preparation and/or assembly. In exemplary embodiments, one such food item may be a cheeseburger sandwich. The POS system 18 can provide this order information to the KMS 20 which operates to coordinate operation of the baked good handling system 10 as well as customer order completion and delivery and restaurant inventory, both in inventory storage as well as for example within the baked good handling system 10 as will be described in further detail herein.

The restaurant IOT system 22 is exemplarily a communication network that includes a locally or remotely located server system that manages communication between the KMS 20 and baked goods handling system 10, and other communication enabled devices in the kitchen. The restaurant IOT system 22 is exemplarily a cloud-computing enabled system whereby data collection and serving of data is handled by one or more processors and/or servers. In embodiments, the restaurant IOT system 22 may include one or more communication gateways that manage the distributed communication to the plurality of component devices and to any other communication enabled devices in the restaurant.

The restaurant IOT system 22 facilitates the communication between the KMS 20 and the baked goods handling system 10 to provide instructions/control messages/commands from the KMS to the component devices, and the IOT system 22 receives information back from the baked goods handling system 10 and relays this information to the KMS 20, for example, information related to device operation, current and/or used inventory or other operational parameters, including an identification of the device.

In operation, the POS system 18 receives the customer order, for example of a cheeseburger sandwich, and provides the order to the KMS 20. The KMS 20 identifies that the ordered cheeseburger sandwich requires a sesame seed roll. This instruction is provided to the holding cabinet 12 and/or to the dispenser 14 through the IOT system 22. The KMS may further identify that the sesame roll is to be toasted. This instruction is provided to the toaster 16. In embodiments, the holding cabinet 12 may operate to select from the plurality of baked goods held therein for dispense by the dispenser, while in other embodiments, the dispenser 14 may select the baked good from the holding cabinet 12 and dispense it. It will be recognized that in still further embodiments, the holding cabinet 12 and the dispenser 14 may be combined as a single unit.

The holding cabinet 12 operates to control the environment within which the baked goods are held. The control of the environment may include, but is not limited to, temperature, humidity, and chemical composition. Embodiments of the holding cabinet 12 may either hold the baked goods at a heated temperature or a cooled temperature in combination with a target humidity, which may also be based upon the selected temperature. Further, the holding cabinet 12 may modify or control the composition of the gases in the environment to lower the oxygen content of the environment, for example with additional Nitrogen or Carbon Dioxide, which may inhibit oxidation and bacterial growth. These controls and operations by the holding cabinet 12 may help to keep the baked goods to stay fresh longer before toasting.

The dispenser 14 conveys, either by gravity or active conveyance, the bun to the toaster 16. The dispenser 14 may further include a separator that operates to separate the bun into two or more portions (e.g. crown and heel, or crown, club, and heel) for toasting individual components of the bun. The toaster 16 is communicatively connected to the KMS 20 through the IOT communication system 22 and receives an instruction that the selected baked good (sesame seed roll) is to be toasted. The toaster 16 may use this information to adjust one or more settings of the toaster 16 to create desired conditions for toasting of the selected baked good. It will be recognized that in embodiments, automation of bun toasting may eliminate human error of being incorrectly loaded into the toaster or the toasting of the wrong type of bun for the customer order. Non-limiting embodiments of toasters, features of which may be used in exemplary embodiments of baked goods handling systems 10 are described in "Toaster with Removable and Adjustable Conveyors", U.S. Patent Application Publication No. 2010/0275689 and "Toaster with Adjustable Conveyor", U.S. Patent Application Publication No. 2018/0289209, which are hereby incorporated by reference herein in their entireties.

The holding cabinet 12, the dispenser 14, and the toaster 16 may communicate back to the KMS 20 through the IOT system 22 to report a status of that device and/or that an operation has been completed. In this manner, the KMS 20 can track the progress of the baked good through its handling by the system 10. Additionally, this can facilitate inventory tracking, for example within the KMS 20. The KMS 20 may track the available inventory and/or conditions within the holding cabinet 12. In further embodiments, communication between the holding cabinet 12 and the KMS can be used to track the age of baked goods within the holding cabinet 12. The location of particular baked goods within the holding cabinet 12 may further be tracked to facilitate the determination and tracking of the particular age of baked goods. In embodiments, the age of baked goods may be tracked in terms of minutes or hours since the baked goods were loaded into the holding cabinet 12. The KMS 20 and/or the holding cabinet 12 may provide an indication when one or more types of baked goods held therein must be replenished. This replenishment may be based upon exceeding determined holding time for baked goods within the holding cabinet or may be based upon depletion of the stock of a particular baked good through use by the system.

Figure 2:
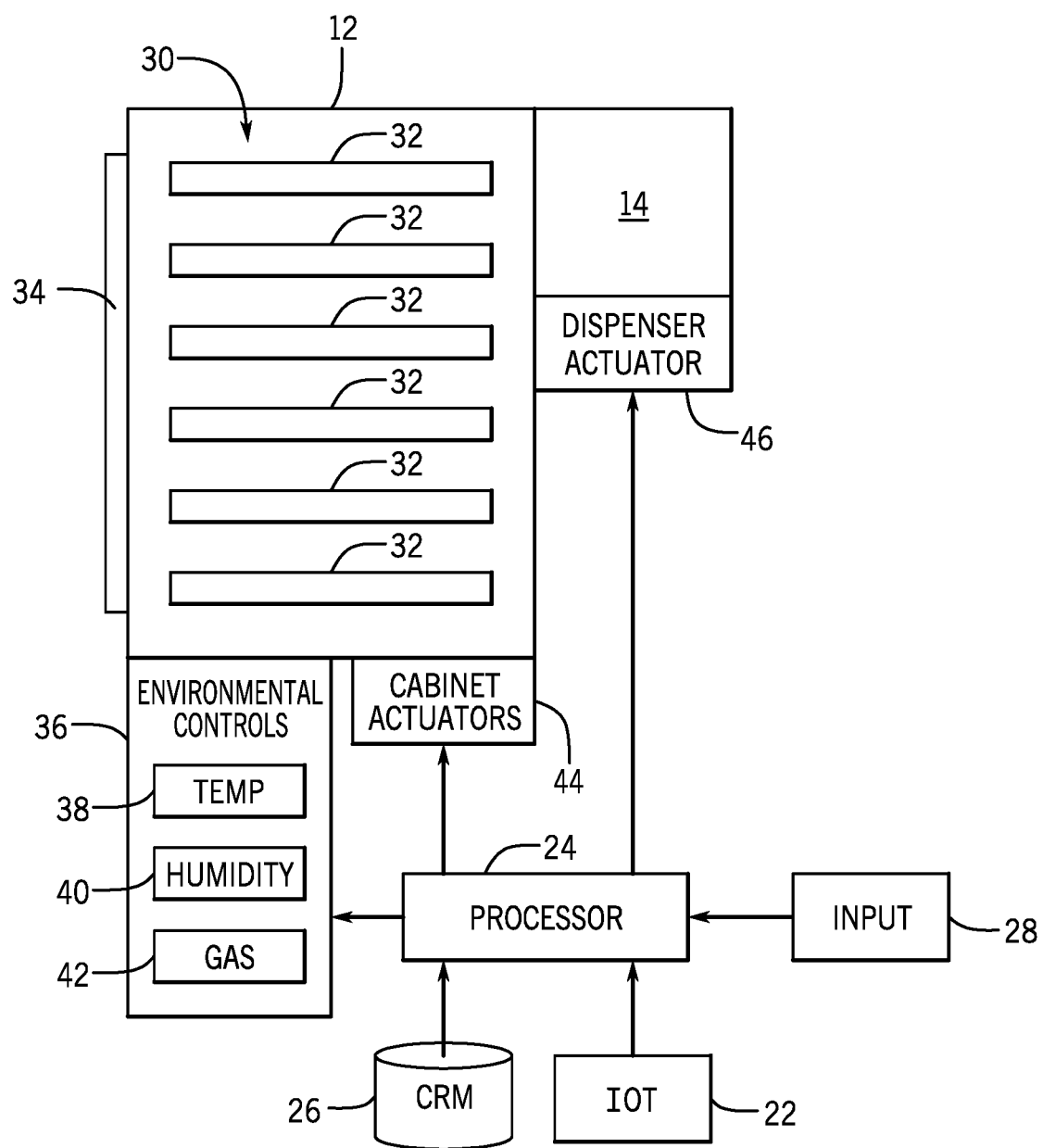
FIG. 2 is a system diagram of an exemplary embodiment of a holding cabinet.

FIG. 2 is a system diagram of an exemplary embodiment of a holding cabinet 12. As previously noted, the holding cabinet and the dispenser may be separate devices, but the embodiment presented in FIG. 2 depicts an embodiment that exemplarily combines the holding cabinet 12 and the dispenser 14 into a single system/device which may be contained within a single housing.

A processor 24 is communicatively connected to the IOT communication system 22, as described above with respect to FIG. 1. The processor 24 receives the instructions regarding a bun required to assemble an ordered sandwich. The processor 24 coordinates the operations and functions of the bun holding cabinet 12 and the dispenser 14 by providing control signals and instructions to various components of the system and collecting data and information from the operation of the system to report back to the KMS through the IOT communication system 22. As used herein, the term processor means any of a variety of known controllers, microcontrollers, integrated circuits, and/or printed circuit boards comprising electronic to read and execute computer readable code to produce instructions and control commands as described in further detail herein. The processor 24 is further communicatively connected to a computer readable medium (CRM) 26, which is non-transient and stores computer readable code that is executable by the processor, and upon execution causes the processor to carry out the functions and operations as described in further detail herein.

The processor 24 is further connected to at least one input device 28 associated with the bun holding cabinet 12. The input device 28 may exemplarily include, but is not limited to, a keyboard and/or a touchscreen interface. The input device 28 is operable by a foodservice worker to perform a manual entry of a control or operation of the bun holding cabinet 12 rather than the instructions received by the processor 24 from the KMS 20 through the IOT communication system 22. In an embodiment, the foodservice worker may use the input device 28 to request a dispense of a particular bun for a special order sandwich to be prepared manually, or as a replacement for a bun damaged elsewhere during assembly of the sandwich. The foodservice worker may have the option to input or control any of the parameters and functions as described herein.

The bun holding cabinet 12 includes a compartment 30 that defines an enclosed area within which a plurality of trays 32 of buns are held. The trays 32 may be standardized trays in which the buns are baked or received by the restaurant. In such embodiments, the trays 32 may be loaded into the compartment 30 through a door 34 in the bun holding cabinet 12. In other embodiments, the trays may be of a different configuration and the buns are transferred into specifically designed trays 32 that are kept in the compartment 30 or are transferred into and out of the compartment 30. Further embodiments are described in additional examples provided herein, but embodiments of trays may include conveyors, pushers, or be configured to work in conjunction with such actuators to operate to dispense buns therefrom.

The processor 24 is communicatively connected to one or more environmental control devices 36. The environmental control devices 36 include a temperature control 38 which may include a heating element and/or a refrigeration element depending upon the conditions for optimal holding of the bun within the compartment 30. The environmental control devices 36 further include humidity control 40, which may include a humidifier and/or a dehumidifier to add or remove moisture from the compartment 30. The environmental control devices 36 further include gas concentration control 42 which may include supplies of gasses, for example, but not limited to, nitrogen or carbon dioxide that can be added to the compartment 30 to preserve bun freshness and inhibit spoilage before the buns are dispensed. While not depicted in FIG. 2, each of these environmental control devices 36 include associated sensors related to the environmental conditions to be controlled, these may include temperature sensors, humidity sensors, and gas composition sensors.

The processor 24 is communicatively connected to at least one cabinet actuator 44. The cabinet actuator 44 exemplarily operates to move the buns within the compartment to control the type and order in which buns are removed from the compartment 30. Exemplary embodiments of types of cabinet actuators 44 are described in further detail herein, although some embodiments may move the entire tray 32, while other embodiments may move individual buns within the compartment 30. Exemplary embodiments may include mechanical elevators, lifts, or conveyors to position the trays 32 within the compartment 30. As previously noted the trays themselves 32 may include conveyors, pushers, or lifts, or be configured to operate with these cabinet actuators 44 within the compartment 30 to move individual buns out of the compartment 30. In other embodiments, the bun holding cabinet 12 may include the conveyors, pushers, or lifts, for example as embodiments of cabinet actuators 44, that are arranged an operate to selectively move buns off of the trays 32. In still further embodiments, the cabinet actuator 44 may include a door or gate, as described herein to control the dispense of buns out of the compartment 30.

In still further embodiments, the bun holding cabinet 12 may include one or more sensors positioned relative to an outlet of the compartment 30. In such embodiments, the cabinet actuators 44 may be operated to move a bun from one of the trays 32 into a queued position relative to the outlet of the compartment 30. When the bun is requested by the KMS, the bun in the queued position is dispensed. In another embodiment, sensors may be arranged within the compartment 30 so as to identify a location of a next bun to be dispensed from the cabinet. With the location of this bun identified, the bun holding cabinet 12 can operate to dispense that bun upon request. In still further embodiments, the cabinet actuators may operate to advance one or more buns towards the outlet of the compartment 30. One or more sensors detect when a bun leaves the outlet and advance of the buns within the compartment 30 is stopped.

The processor 24 is communicatively connected to at least one dispenser actuator 46 of the dispenser 14. As previously noted, the dispenser 14 in embodiments is integrated with the bun holding cabinet 12. The dispenser 14 may include a gate, which may be in the form of a door, to control the exit of a bun from the bun holding cabinet 12, the dispenser may include a conveyor or other powered manner of moving the bun from the bun holding cabinet 12 to the toaster (not depicted). The dispenser 14 may further include a bun separator and/or a bun diverter as examples of dispenser actuators 46. The bun separator, as described in further detail herein separates the portions of a pre-sliced bun (e.g. crown and heel, and optionally a club section), a diverter may direct a bun or a portion of a bun into a particular lane of a toaster. The lane of the toaster may be configured for particular toasting requirements specific to a bun portion.

Figure 3:
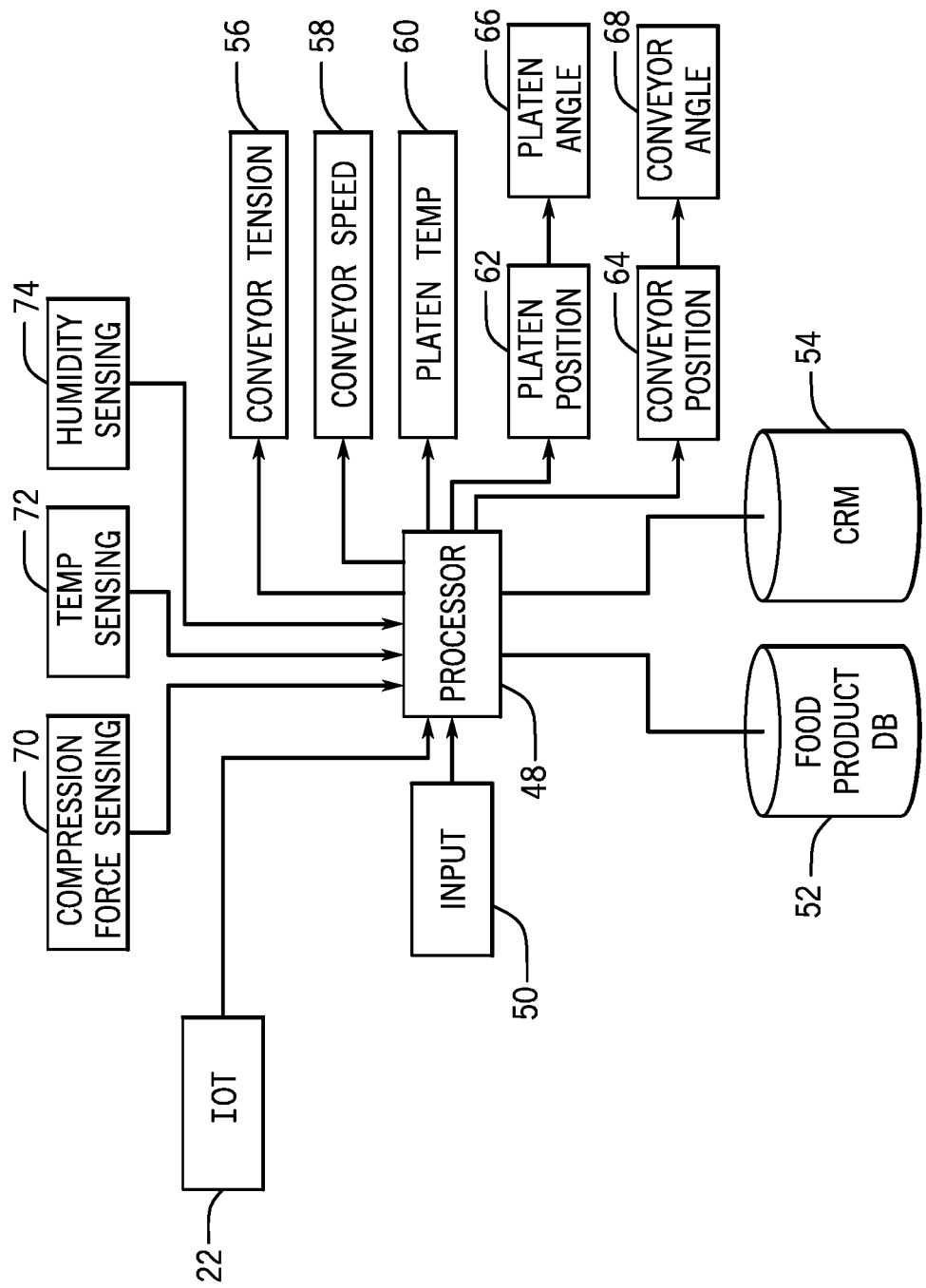
FIG. 3 is a system diagram that depicts an exemplary embodiment of a toaster.

FIG. 3 is a system diagram that depicts exemplary functions and operations of an embodiment of a toaster 16. In the exemplary embodiment, the functions and operations of the toaster 16 are controlled and carried out by a processor 48, as previously shown and described above with respect to processor 24 in FIG. 2. The processor 48 is similarly connected to a CRM 54 upon which executable computer readable code is stored and the processor 48 is further connected one or more input devices 50 which may be used by a foodservice worker to input any of a variety of toaster controls, for example to input specific conditions to toast an individual bun, to set general controls or inputs for operation of the toaster. These manual inputs may include service controls or inputs regarding a type of food product to be toasted, a mode or configuration for toasting control, and/or to input specific controls or instructions for future toasting of food products. A keyboard/touchscreen interface, exemplarily a touch-sensitive display, may be used to select a variety of food products the dimensions, qualities, and toasting requirements of which may be stored in a food product database 52.

The inputs received at the input device 50 may further exemplarily include conveyor belt speed and platen temperature, or a plurality of preset toasting configurations. In embodiments, these preset toasting configurations may be common setting combinations of temperature and speed. For example, a high output mode may use a high temperature and conveyor speed, while an efficiency mode may use a lower temperature and speed. Based upon a kitchen's use patterns, these may be characterized into a "breakfast", "lunch", and "late-night" settings. In a still further exemplary embodiment, the preset configurations may identify particular bread types (e.g. bun, bagel, English muffin, toast). Each of these bread types may have a particular combination of one or more of toaster gap, belt tension, conveyor speed, and platen temperature for desired toasting of that particular baked product. In an embodiment, these setting combinations may be stored in the food product database 52.

As previously noted, the toaster 16, and more specifically, the processor 48 of the toaster may be communicatively connected to the KMS through the IOT communication system 22. In these embodiments, the processor 48 may receive a direct information or commands as to the toasting operation to be performed on each bun dispensed from the bun holding cabinet 12 via the dispenser 14. The information received by the processor 48 from the KMS may include all of the toaster settings for operation, or as noted above, may provide an indication of a type of baked good to be toasted and the processor 48 can determine and carry out the control parameters or the toaster based upon information stored at the food product database 52.

In still further exemplary embodiments, the input device 50 may include video and/or image capturing, for example, associated with the feed opening can be used, in conjunction with image processing techniques and apparatus to identify the food product being dispensed into the toaster 16. Once the food product has been identified, the appropriate toaster setting and/or toasting profile from the food product database 52 may be accessed by the processor 48. In a still further exemplary embodiment, the input device 50 may include a size detection, either based upon physical actuators located near the inlet to the toaster or based upon the captured images is used to identify or gather additional information regarding the bread product to be toasted. As used herein size detection may be a detection of any physical property of the bread product, which may include a dimension, shape, volume, weight, density, or other property as may be recognized in view of this disclosure. For example, optical (e.g. lasers or infrared) or ultrasound or other dimension detection techniques may be used to identify dimensions, volume, and/or shape of the food product. In some embodiments, measurement of one or more of these may be indicative of the food product itself, particularly when food products to select from are varied in these parameters or when a food product has a particular known size and/or shape. In still further embodiments, the weight and/or density of the food product may be identified in addition to the dimension detection described above, this can be a further distinguishing characteristic between otherwise similarly dimensioned food products. This may exemplarily be done with the use of a load cell arranged in relation to an inlet of the toaster 16.

The processor 48, having received an identification of the food product to be toasted, accesses the food product database 52 to retrieve information regarding the food product, and particularly a toasting profile for the food product. As noted, an instruction as to the baked good to be toasted and the toasting profile for the baked good may be provided to the toaster 16 from the KMS through the IOT communication system 22. The toasting profile may include a variety of adjustments made to the toaster system to achieve a predetermined standard of toasting for the food product. The toaster includes multiple systems which are independently adjustable in order to accommodate a wide variety of food products and toasting requirements of such food products. Therefore, according to the toasting profile, the processor may adjust the conveyor tension at 56, for example by adjusting the position of a mounting head of a tension spring within the toaster. The processor 48 may adjust the conveyor speed 58, for example by operating one or more of the conveyor drive motors of the toaster to a predetermined speed. In an exemplary embodiment, a system that includes two or more parallel toasting systems, the drive motors of different conveyors may be operated at different speeds so as to toast two baked goods simultaneously or to toast two baked goods with different toasting requirements in the same amount of time.

The processor 48 may control or operate the platen temperature 60. This may be performed by operating a heating coil internal to the heated platens. The processor 48 may further adjust the platen position 62 and/or the conveyor position 64 such as to control a toaster gap between the conveyor and the platen, which may determine compression of a baked good during toasting and/or affect the heat transfer from the platen into the baked good during toasting. This may be exemplarily performed by moving the top and/or bottoms of the platen and/or the conveyor assembly for example by rack and pinion or linear actuator. As a result of the platen and the conveyor being individually positionable at both the top and bottom of these respective devices, adjustment of the platen position 62 and the conveyor position 64 can further result in adjustment of the platen angle 66 and the conveyor angle 68 for example by moving the top and/or bottom of the platen and/or conveyor to a position different from the respective other end.

It is further recognized that these adjustments may also be made intra-toasting such as to create further toasting effects or to achieve a predetermined toasting amount or color. For example, while the identified food product is being toasted, the processor 48 may adjust the conveyor tension 56 to increase or reduce the crushing force against the food product, forcing the food product against the platen in order to change the toasting effect achieved.

Additionally, the processor 48 may further receive feedback from one or more sensors located within the toaster to provide information regarding the actual toasting conditions achieved within the toaster. This feedback may be used by the processor to adjust the operation of the toaster in a manner so as to achieve the predetermined toasting qualities. The processor 48 may receive data indicative of compression force sensing 70 temperature sensing 72, and humidity sensing 74. Such sensors may be respectively located internal to the toaster in a manner so as to gather the associated information. For example, temperature sensing and/or humidity sensing may be used for example to identify if a food product was frozen, or dry, or more moist than normally expected and the processor 48 may adjust the operation of the toaster to remediate these conditions of the food product during operation of the toaster.

Figure 4:
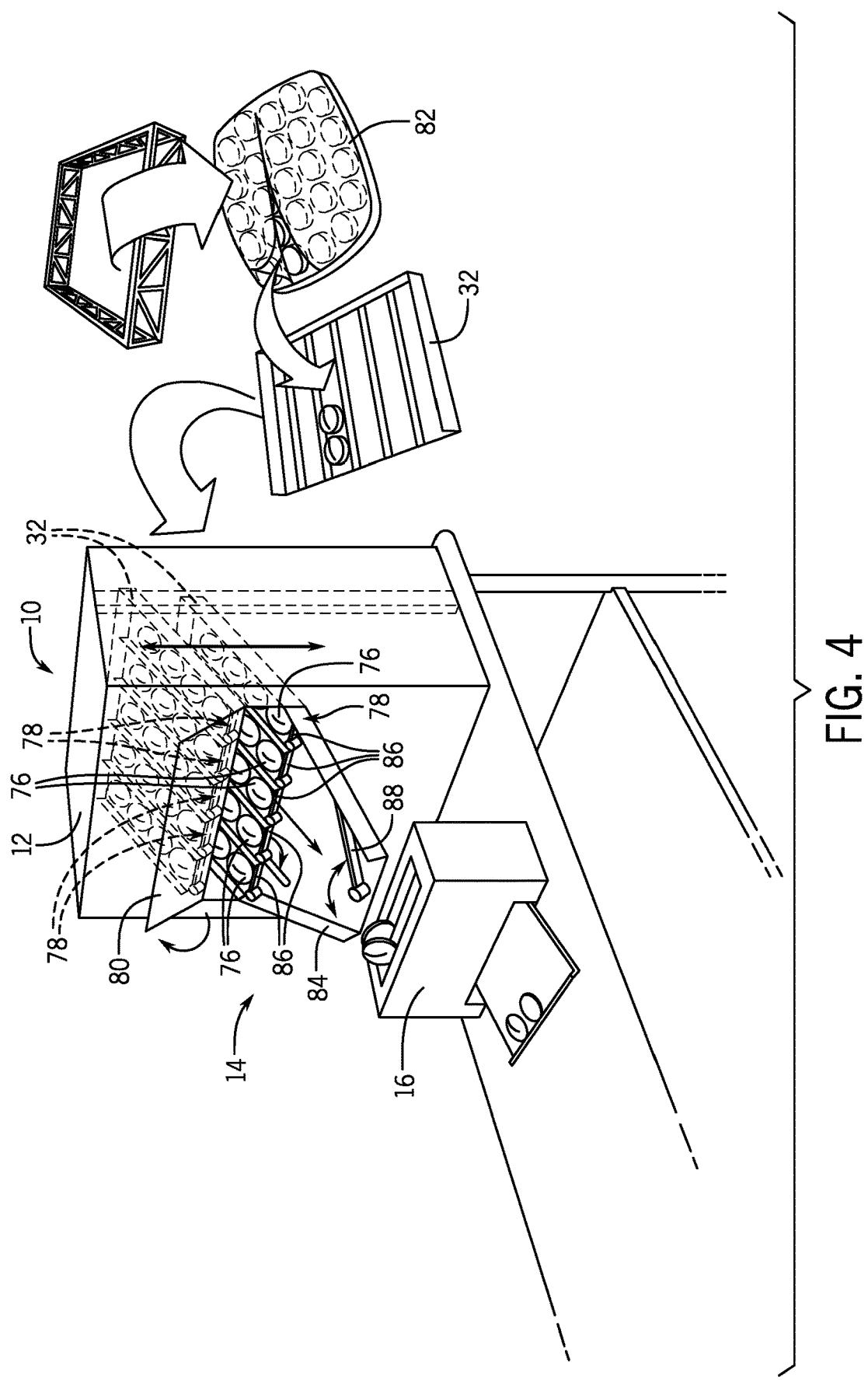
FIG. 4 depicts an exemplary embodiment of a baked goods handling system.

FIG. 4 depicts an exemplary embodiment of the baked good handling system 10. In this embodiment, the baked goods, exemplarily buns 76, are held in cabinet trays 32 that are held on an incline within the holding cabinet 12. The trays 32 exemplarily arrange the buns into chutes 78. In embodiments, each tray 32 may hold the same type of baked good, while in other embodiments, each chute 78 may hold a different type of baked good. The holding cabinet 12 includes a door 80 that helps to maintain the controlled environment within the compartment 30 of the holding cabinet 12. While FIG. 2 presents one embodiment of the door 80, it will be recognized that in other embodiments, the door 80 may be flexible and thus more in the form of a flap, while in still further embodiments, multiple doors 80 may be used, for example with one door associated with each chute 78 of the tray 32, or with a door or doors 80 each associated with a particular tray 32 from which baked goods may be advanced.

The holding cabinet 12 is exemplarily configured to hold a plurality of trays 32 within the controlled environment of the compartment 30 of the holding cabinet 12. The holding cabinet 12 is operable, by way of a cabinet actuator, for example in the form of a mechanical elevator, lift, or conveyor to position the trays 32 within the holding cabinet 12. In a merely exemplary and non-limiting embodiment, trays 32 filled with buns 76 are loaded into the bottom of the holding cabinet 12. As more buns are needed/used, the holding cabinet 12 operates to cycle the trays 32 upwards to position a tray 32 filled with buns 76 in a dispensing position, for example, relative to the door 80 and/or the dispenser 14. Once the buns from that tray 32 are dispensed, the holding cabinet 12 operates to move the empty tray 32 further up within the compartment 30 of the holding cabinet 12 for storage and/or removal, while a new tray 32 is filled with buns 76, exemplarily from a pillow pack 82, is inserted into the bottom of the compartment 30 and a tray 32 is cycled into the dispensing position within the holding cabinet 12. A person of ordinary skill in the art will recognize variations from this disclosed embodiment that are within the scope of the present disclosure.

Currently, baked goods often are received from a bakery in bagged "pillow packs" 82 The pillow packs 82 are constructed and treated such as to create an environment suitable for holding and preserving the quality of the baked goods therein. However, upon opening the pillow pack 82, the baked goods will quickly begin to degrade and become stale. Thus, in use, the pillow packs 82 may be opened and the baked goods directly loaded onto a tray 32 and moved to the controlled environment of the holding cabinet 12. This limits the exposure of the baked goods to the ambient air and enables the holding cabinet 12 to promote baked good holding and quality. In exemplary embodiments, individual trays 32, chutes 78, or portions of trays 32 (e.g. combinations of chutes 78), may be filled with baked goods and loaded into the holding cabinet 12. In embodiments, the pillow packs 82 may be bifurcated or otherwise separated into sections such that only a portion of a pillow pack 82 need be opened to fill a single tray 32 or portion of a tray 32.

The dispenser 14, exemplarily includes a ramp 84 that conveys by gravity feed a bun 76 to the toaster 16. In still further embodiments, the dispenser includes a conveyor that operates to mechanically move the bun 76 to the toaster 16, rather than by gravity feed. Still further embodiments may use a combination of solutions to move the bun to the toaster. The dispenser 14 further exemplarily includes inlet gates 86 and an outlet gate 88. The inlet gates 86 may operate in a similar manner as a door 80 to help to control the dispense of a single bun 76 from a selected chute 78 of the tray 32. As noted above, this can provide a mechanism whereby the dispenser 14 can select a particular type of baked good from a plurality of available baked goods. The outlet gate 88 exemplarily operates as a diverter and includes an arm that rotates about a pivot. The outlet gate 88 rotates the arm about the pivot point to direct buns to different portions of the toaster 16. In this manner, multiple buns may be toasted simultaneously with a single toaster. In another embodiment, multiple toasters may be used, for example with different toasting, operational, or mechanical features or settings. The outlet gate 88 can direct the bun to the appropriate toaster 16, for example, based upon a communication from the KMS through the IOT system as described above.

As will be described in further detail herein, buns that have been held in storage may require mechanical separation of bun halves prior to toasting. In embodiments, the outlet gate 86 can provide this separation function, for example by creating a restriction at the outlet through which the bun must travel, the compression of the bun as it moves through the restriction can force the bun halves apart. In a further embodiment, the arm of the outlet gate 86 may operate in a manner such as to further apply a force against the bun as the bun passes through the outlet gate 86, for example by rotation of the arm of the outlet gate 86. In a still further embodiment, the outlet gate 86 may be oriented at a position elevated above the toaster 16, this causes the dispensed bun to fall prior to hitting and engaging the toaster 16. Upon this impact, the bun may split into the bun halves and the bun halves direct into respective slots or toasting paths of the toaster 16.

Figure 5:
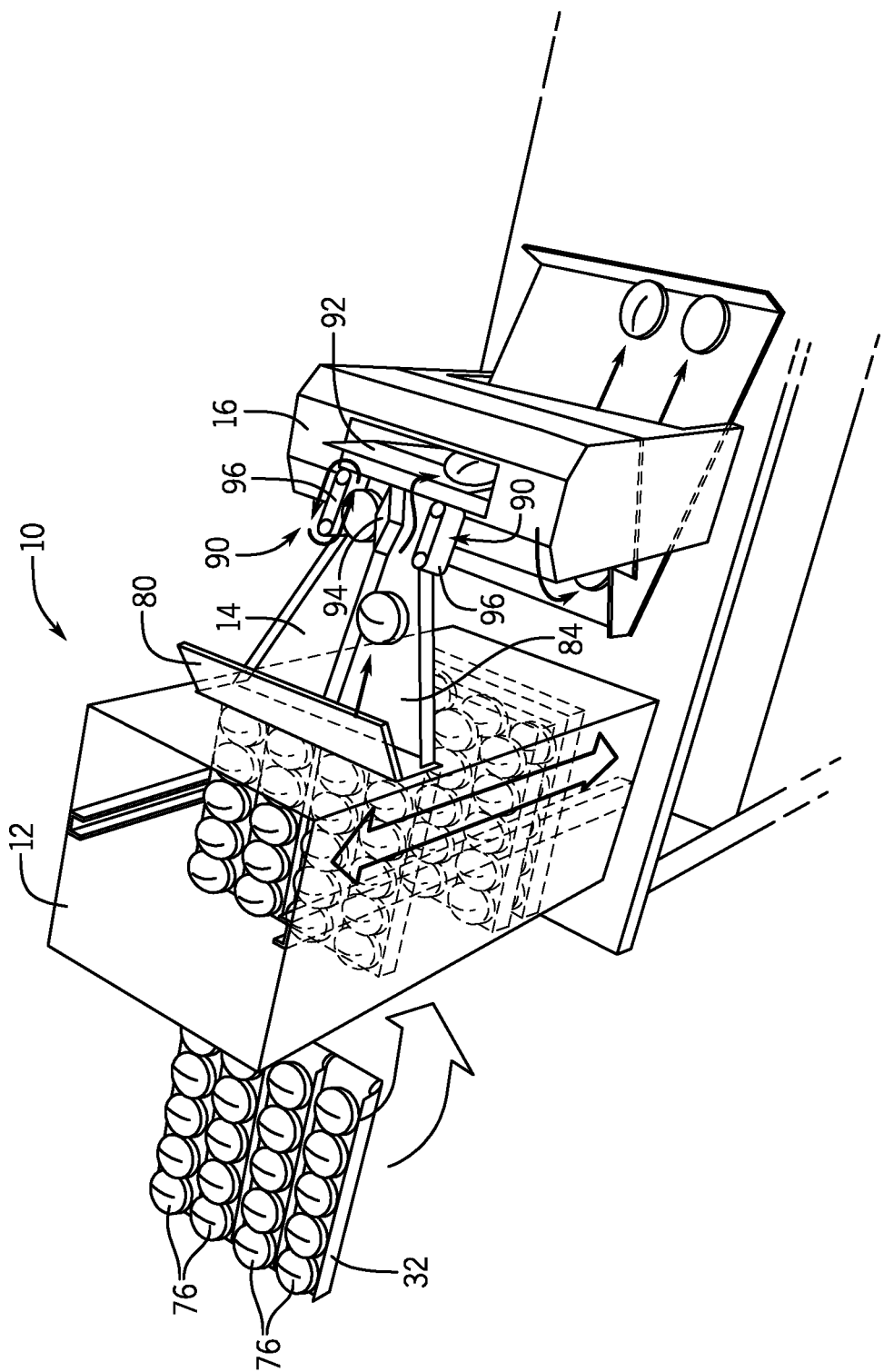
FIG. 5 depicts a further exemplary embodiment of a baked goods handling system.

FIG. 5 depicts another exemplary embodiment of a baked goods handling system 10 within the scope of the present disclosure. Like reference numerals are used herein to denote similar components between embodiments while focusing the disclosure on features shown in this embodiment. A person of ordinary skill in the art will recognize from the present disclosure that components between the various embodiments may be combined and recombined with more or fewer components to arrive at still further embodiments within the scope of the present disclosure.

The holding cabinet 12 as depicted in FIG. 5, receives trays 32 of the baked goods (eg. buns 76) for holding and dispensing. In an exemplary embodiment, the trays 32, and/or portions of trays 32, and/or individual chutes 78 of trays 32 are movable within the holding cabinet 12 to provide for a selection of a variety of baked good types either all available at the dispensing position, or movable to be arranged at the dispensing position. This may also provide for inventory management as some trays/tray portions and/or chutes may be dedicated to specialty or lower volume baked goods while other trays/tray portions and/or chutes may be dedicated to high volume baked goods. The high volume baked goods can thus be used and replenished more frequently while the holding cabinet maintains the quality of the specialty/lower volume baked goods awaiting use in an order. The trays 32 and/or individual chutes 78 of the trays 32 may include conveyors which can operate to advance a single bun for dispense. In an exemplary embodiment, this may help to control dispense of buns and ensure that the selected bun is dispensed.

The dispenser 14 further includes a bun separator 90. It has been recognized by the inventors that even when baked goods have been pre-sliced (e.g pre-sliced buns or bread), that the environmental conditions that promote the preservation of baked good quality also can cause the slices to fuse or stick at the sliced interface. Therefore, additional mechanical separation in the dispense of baked goods is needed in embodiments to be able to properly direct bun portions or slices into the toaster 16 and/or to particular toasting paths of the toaster 16. The toaster 16 may include a separation plate 92 that divides the toasting paths and also creates a further physical obstruction against which the bun may strike to further separate the bun portions. The bun separator 90 exemplarily includes a restriction 94 and a conveyor 96. The restriction 94 is exemplarily a narrowed portion of the ramp 84 that narrows to a dimension smaller than a diameter of the bun 76. The conveyor 96 engages the bun 76 with a belt configured in a manner such as to move the bun 76 without damage thereto. The conveyor 96 places additional force on the bun 76 to move the bun 76 through the restriction 94. The bun 76 laterally compresses to move past the restriction 94 and this compression forces disengagement between the pre-sliced bun portions, setting the bun up for separation.

Figure 6:
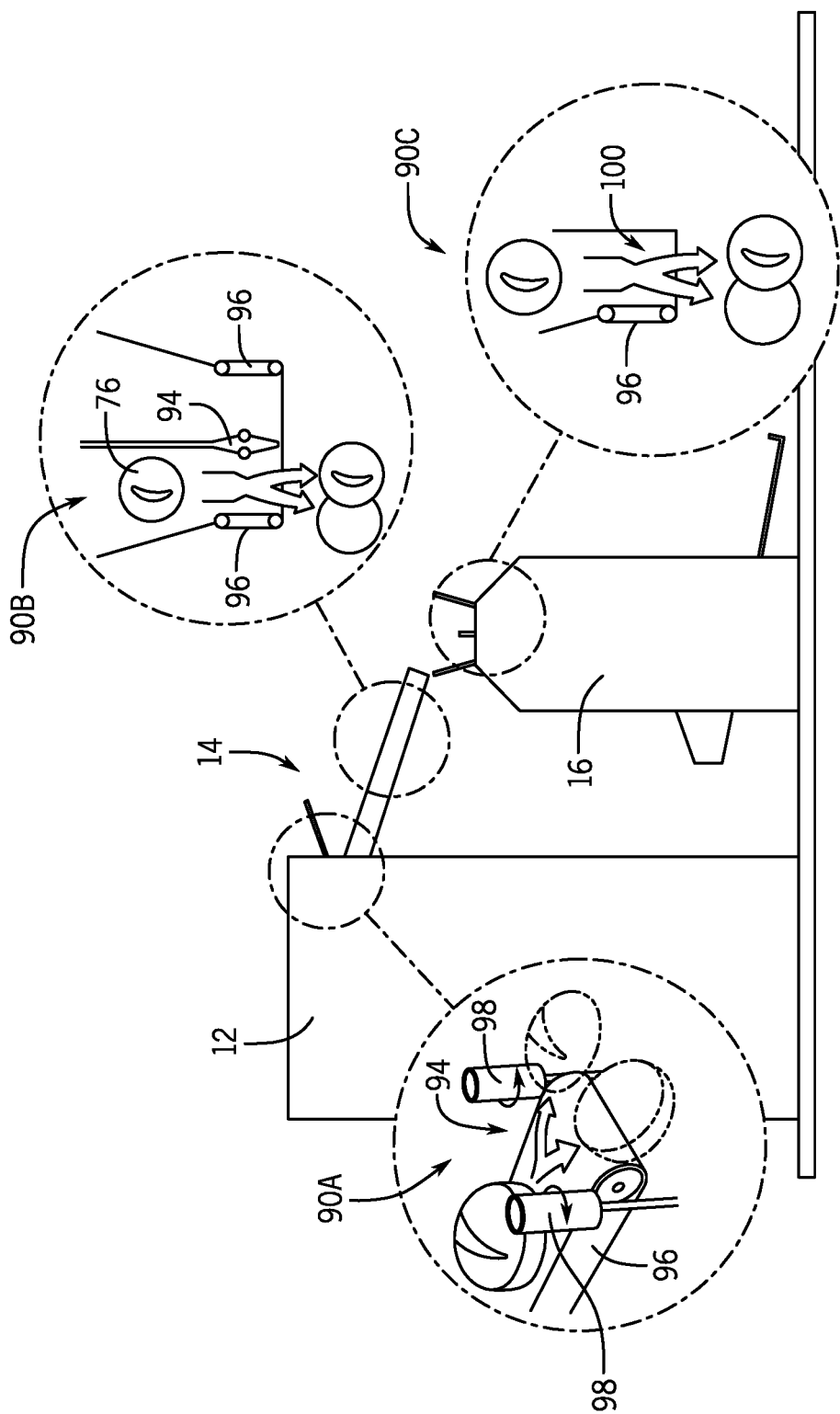
FIG. 6 depicts exemplary embodiments of bun separators.

Exemplary embodiments and positions of bun separators 90 are depicted and described with respect to FIG. 6. Different embodiments of bun separators 90A-C shown in FIG. 6 demonstrate some examples of ways in which the dispenser 14, the holding cabinet 12, or the toaster 16 may separate the bun portions. As shown with respect to bun separator 90A, the conveyor 96 may exemplarily be located at the bottom surface, such as in a manner to advance the bun 76. The restriction 94 is exemplarily provided by rollers 98 arranged adjacent the conveyor 96. These rollers can provide the restriction/compression of the bun, but due to the movement offered by the rollers, may be more gentle on the bun. Bun separator 90C is exemplarily arranged vertically, or near vertically. Due to the orientation of the bun, a specific mechanical restriction may not be needed, instead, the dimension of the opening 100 may provide any restriction in combination with the conveyor 96.

While various embodiments of bun separators 90 are described above, it will be recognized that still further embodiments of bun separators 90 may be used within the embodiments of the dispensers 14 and/or handling systems 10 as described herein. These still further embodiments include, but are not limited to embodiments wherein the bun portions are individually mechanically engaged. For example, offset rollers, bump outs, restrictions, or conveyors may be configured to engage one or the other of bun portions. In an example, this may also create directionality to the separation of the bun portions, and help to direct the bun portions to different toasting paths. In still further embodiments, a physical and/or mechanical obstruction, for example, a wedge, blade, crossbar, crosswire may obstruct the bun at the interface between the bun portions, an applied force to the bun, for example by a conveyor may force the bun portions to separate to move the, now separated, bun portions past the obstruction.

As depicted in FIG. 5, an exemplary process for handling baked goods includes a number of actions performed by and with components of the baked goods handling system 10. These actions may be performed by individual initiation at each of the components, for example, upon user inputs or actions at each of the components as described herein, or may be performed automatedly based upon instructions provided by the KMS through the IOT communication system as described above. In still further embodiments, the components of the baked goods handling system may communicate directly with one another for example by wired or wireless communication. In a still further embodiment, the baked goods handling system 10 may be integrated into a single apparatus that provides holding, dispensing and toasting functions.

An exemplary embodiment of a process for handling of baked goods includes loading the baked goods, e.g. buns on to trays, and loading those trays into the holding cabinet 12. The holding cabinet 12 creates a controlled or otherwise conditioned environment to promote quality of the baked goods as the baked goods are held pending dispense. As baked goods are dispensed from the holding cabinet 12, the holding cabinet 12 moves successive trays of baked goods into a dispensing position. In another embodiment, the holding cabinet 12 can move particular type or types of buns into the dispensing position so the system can dispense a selected baked good type from a plurality of baked good types stored within the holding cabinet 12. The Dispenser 14 provides for the selected baked good to be removed from the holding cabinet 12 and conveyed in the direction of the toaster. The dispenser includes a separator that operates to separate portions of the baked good, for example, pre-sliced halves of a bun that may stick together from the holding process. The separated bun portions are directed into appropriate toasting paths within the toaster 16. A single toaster may have multiple toasting paths and the toaster may operate with different operational parameters for each of the toasting paths. In this manner, the toaster may have toasting paths configured to toast the crown and the heel of a bun differently. The dispenser 14 directs the appropriate portion of the bun out of the separator into the appropriate toasting path of the toaster. In an exemplary embodiment, the toaster is further configured to operate to dispense the toasted bun portions simultaneously or near-simultaneously and in a desired orientation. In an embodiment, this may mean that one of the toasting paths advances the bun portion at a greater or lesser speed and/or the toaster is configured to reverse or flip a portion of the bun after toasting.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A handling system for baked goods, comprising:
 a holding cabinet operable to create a controlled environment therein;
 a dispenser connected to the holding cabinet that receives a baked good from the holding cabinet and directs the baked good away from the holding cabinet;
 a treatment device disposed relative to the dispenser such that the treatment device receives the baked good from the dispenser to perform a treatment on the baked good; and
 a plurality of trays, each tray comprising at least one chute configured to hold the baked good, and the chutes are independently or semi-independently movable within the holding cabinet to selectively position at least one chute with the baked good relative to the dispenser.

2. The handling system of claim 1, further comprising:
 a kitchen management system (KMS) communicatively connected to the holding cabinet, the dispenser, and the treatment device; and
 a point of sale system communicatively connected to the KMS, the point of sale system receives an input of a food order and provides the food order to the KMS.

3. The handling system of claim 2, wherein the KMS identifies at least one baked good associated with the food order and instructs the holding cabinet and the dispenser to retrieve the identified at least one baked good from the holding cabinet, and the KMS instructs the treatment device with treatment configurations for treating the at least one baked good.

4. The handling system of claim 1, wherein the treatment device is a toaster.

5. The handling system of claim 1 further comprising a bun separator configured to engage the baked good dispensed from the holding cabinet and mechanically force apart at least two portions of the baked good.

6. The handling system of claim 1 wherein the plurality of trays each further comprises at least one conveyor configured for the baked good to be loaded thereon and each conveyor is operable to move the baked good out of the holding cabinet.

7. The handling system of claim 1, wherein the holding cabinet further comprises at least one conveyor, the at least one conveyor operates to advance the baked good of a plurality of baked goods held on the plurality of trays out of the holding cabinet.

8. The handling system of claim 1, wherein the holding cabinet and the dispenser are configured as a single unit.

9. A baked good dispenser comprising:
a baked good control device that operates to selectively release a baked good; and
a bun separator that engages the baked good and divides the baked good into a first portion and a second portion and directs the first portion and the second portion to different locations;
wherein the bun separator comprises a conveyor and a restriction, wherein the conveyor operates to move the baked good through the restriction.

10. The baked good dispenser of claim 9, further comprising a ramp that directs the baked good towards a dispenser outlet, wherein the bun separator is positioned at the dispenser outlet.

11. The baked good dispenser of claim 9, further comprising a holding cabinet operable to create a controlled environment conducive the baked good and wherein the baked good control device is configured to release the baked good from the holding cabinet.

12. The baked good dispenser of claim 11, wherein the baked good control device comprises a gate between the holding cabinet and the bun separator.

13. The baked good dispenser of claim 11, wherein the baked good control device comprises at least one conveyor within the holding cabinet.

14. The baked good dispenser of claim 13, further comprising a plurality of trays, each tray configured to receive a plurality of baked goods the plurality of baked goods comprising the baked good, wherein the plurality of trays are received within the holding cabinet and the at least one conveyor operates to advance the baked good of the plurality of baked goods out of the holding cabinet.

15. The baked good dispenser of claim 11 wherein the controlled environment comprises at least one of a controlled temperature, a controlled humidity, and a controlled atmosphere composition.

16. The baked good dispenser of claim 11, further comprising:
a communicative connection from the baked good dispenser to a kitchen management system (KMS), wherein the holding cabinet and the baked good control device receive operation instructions from the KMS through the communicative connection;
wherein based upon the operation instructions received from the KMS the baked good is identified and, the holding cabinet and the baked good control device operate to retrieve and dispense the baked good from the holding cabinet.

17. The baked good dispenser of claim 9, wherein the bun separator comprises a physical obstruction that engages the baked good.

* * * * *